(12) United States Patent
Mary et al.

(10) Patent No.: US 12,294,488 B2
(45) Date of Patent: May 6, 2025

(54) CLIENT DEVICE CONFIGURATION BASED ON CLIENT CONTEXT

(71) Applicant: WarnerMedia Direct, LLC, New York, NY (US)

(72) Inventors: Hazel Diana Mary, East Norriton, PA (US); Erik Fortune, Redmond, WA (US); Adam Gilman, Älta (SE); Franklyn Hu, Seattle, WA (US)

(73) Assignee: WARNERMEDIA DIRECT, LLC, New York, NY (US)

( * ) Notice: Subject to any disclaimer, the term of this patent is extended or adjusted under 35 U.S.C. 154(b) by 0 days.

(21) Appl. No.: 18/435,153

(22) Filed: Feb. 7, 2024

(65) Prior Publication Data
US 2024/0179052 A1   May 30, 2024

Related U.S. Application Data

(63) Continuation of application No. 17/686,328, filed on Mar. 3, 2022, now Pat. No. 11,924,030.

(51) Int. Cl.
| | |
|---|---|
| *H04L 41/0806* | (2022.01) |
| *H04L 67/51* | (2022.01) |
| *H04L 101/69* | (2022.01) |

(52) U.S. Cl.
CPC ......... *H04L 41/0806* (2013.01); *H04L 67/51* (2022.05); *H04L 2101/69* (2022.05)

(58) Field of Classification Search
CPC . H04L 41/0806; H04L 67/51; H04L 67/1021; H04L 2101/69; H04L 61/4541
See application file for complete search history.

(56) References Cited

U.S. PATENT DOCUMENTS 8,738,791 B1   5/2014  Martini
9,128,472 B2 *  9/2015  Lawson ................ G06F 16/248
(Continued)

FOREIGN PATENT DOCUMENTS

CN   113746882 A    12/2021
EP    3422745 A1 *  1/2019
(Continued)

OTHER PUBLICATIONS

U.S. Appl. No. 17/686,328, filed Mar. 3, 2022.
(Continued)

*Primary Examiner* — Alina A Boutah
(74) *Attorney, Agent, or Firm* — Amin, Turocy & Watson, LLP

(57) ABSTRACT

The described technology is generally directed towards configuring a client device with client configuration data based on client context data. The configuration data can include endpoints of various services to which the client can connect that are appropriate for the client device based on the client context data, along with dimension information (route key values) for connecting to each such service. For example, a roaming client device can be given an endpoint and dimension information to connect to a content service in the roaming region, with a different endpoint and dimension information for communicating user information to a home region to which the user is affiliated. This facilitates single hop/reduced latency for content requests, and compliance with home regulations via a single hop to the home service.

20 Claims, 10 Drawing Sheets

(56) References Cited

U.S. PATENT DOCUMENTS

| | | | |
|---|---|---|---|
| 9,165,124 | B1 | 10/2015 | Gurevich et al. |
| 10,020,936 | B1 | 7/2018 | Ghetti et al. |
| 10,122,682 | B1 | 11/2018 | Salour et al. |
| 11,539,817 | B1* | 12/2022 | Perez ................. H04L 67/1012 |
| 2003/0004746 | A1 | 1/2003 | Kheirolomoom et al. |
| 2004/0202327 | A1 | 10/2004 | Little et al. |
| 2005/0154888 | A1 | 7/2005 | Chen et al. |
| 2006/0168259 | A1 | 7/2006 | Spilotro et al. |
| 2012/0008786 | A1 | 1/2012 | Cronk et al. |
| 2012/0023554 | A1 | 1/2012 | Murgia et al. |
| 2012/0102329 | A1 | 4/2012 | Mittal et al. |
| 2014/0164584 | A1 | 6/2014 | Joe et al. |
| 2015/0100578 | A1* | 4/2015 | Rosen ................... G06F 16/907 |
| | | | 707/737 |
| 2015/0113172 | A1 | 4/2015 | Johnson et al. |
| 2015/0113647 | A1 | 4/2015 | Sakamaki et al. |
| 2015/0256861 | A1 | 9/2015 | Oyman |
| 2015/0334049 | A1 | 11/2015 | Miura |
| 2016/0099924 | A1* | 4/2016 | Mehta ................. H04L 61/4552 |
| | | | 726/7 |
| 2016/0099941 | A1 | 4/2016 | Hein |
| 2017/0104842 | A1* | 4/2017 | Busayarat ............. H04L 43/045 |
| 2017/0223005 | A1 | 8/2017 | Birgisson et al. |
| 2017/0324986 | A1 | 11/2017 | Gay et al. |
| 2017/0373932 | A1 | 12/2017 | Subramanian et al. |
| 2019/0028552 | A1 | 1/2019 | Johnson et al. |
| 2019/0108324 | A1* | 4/2019 | Graube ............... H04L 63/0861 |
| 2019/0372888 | A1* | 12/2019 | Michael .................. H04L 45/64 |
| 2020/0244605 | A1 | 7/2020 | Nagaraja et al. |
| 2020/0311135 | A1 | 10/2020 | Kligman et al. |
| 2020/0359210 | A1 | 11/2020 | Akkad et al. |
| 2020/0366574 | A1* | 11/2020 | Schubert ............. H04L 41/5032 |
| 2020/0403911 | A1* | 12/2020 | Singhal ................... H04L 45/34 |
| 2021/0034760 | A1 | 2/2021 | Banga |
| 2021/0329096 | A1 | 10/2021 | Reddem |
| 2023/0185443 | A1 | 6/2023 | Yao et al. |

FOREIGN PATENT DOCUMENTS

| | | |
|---|---|---|
| EP | 3 739 848 A1 | 11/2020 |
| WO | 2020/193555 A1 | 10/2020 |

OTHER PUBLICATIONS

Non-Final Office Action received for U.S. Appl. No. 17/686,328, dated Mar. 27, 2023, 83 pages.

Alexandra, "What are Microservices? Code Examples, Best Practices, Tutorials and More", Sep. 13, 2019, 3 pages.

Non-Final Office Action received for U.S. Appl. No. 17/653,448, dated May 24, 2023, 60 pages.

Contavalli et al., "Client Subnet in DNS Queries", Internet Engineering Task Force (IETF), Request for Comments: 7871 W. ISSN: 2070-1721, Google, May 2016, 30 pages.

Anonymous: "CDN: How is it Possible that My DNS Delivers a Different IP Depending on the Visitors Location?", Oct. 7, 2021, XP093045374, Retrieved from the Internet: URL:https://serverfault.com/questions/8356 60/cdn-how-is-it-possible-that-my-dns-deli vers-a-different-ip-depending-on-the-vis [retrieved on Nov. 7, 2023] the whole document, 5 pages.

International Search Report and Written Opinion for International Application No. PCT/US2023/014391 dated May 24, 2023, 13 pages.

Notice of Allowance received for U.S. Appl. No. 17/686,328, dated Oct. 25, 2023, 73 pages.

Final Office Action received for U.S. Appl. No. 17/653,448, dated Oct. 4, 2023, 25 pages.

International Search Report and Written Opinion for International Application No. PCT/US2023/014388 dated Jun. 15, 2023, 11 pages.

Notice of Allowance received for U.S. Appl. No. 17/653,448, dated Dec. 11, 2023, 35 pages.

Notice of Allowance received for U.S. Appl. No. 17/686,328, dated Nov. 15, 2023, 6 pages.

Notice of Allowance received for U.S. Appl. No. 17/686,328, dated Dec. 6, 2023, 10 pages.

Notice of Allowance received for U.S. Appl. No. 17/686,328, dated Jan. 31, 2024, 6 pages.

Communication pursuant to Rules 161(1) and 162 EPC received for European Patent Application Serial No. 23712996.0 dated Oct. 11, 2024, 3 pages.

Communication pursuant to Rules 161(1) and 162 EPC received for European Patent Application Serial No. 23713797.1 dated Oct. 11, 2024, 3 pages.

Non-Final Office Action received for U.S. Appl. No. 17/653,450 dated Sep. 26, 2024, 64 pages.

Final Office Action received for U.S. Appl. No. 17/653,450 dated Mar. 27, 2025, 79 pages.

* cited by examiner

CLIENT DEVICE CONFIGURATION BASED ON CLIENT CONTEXT

CROSS-REFERENCE TO RELATED APPLICATIONS

This application is a non-provisional of pending U.S. patent application Ser. No. 17/686,328, filed on Mar. 3, 2022, entitled "CLIENT DEVICE CONFIGURATION BASED ON CLIENT CONTEXT." The entirety of the aforementioned application is hereby incorporated herein by reference.

BACKGROUND

When dealing with a single product distributed globally among client devices, a typical implementation is to have a single common endpoint or DNS (domain name service) entry that resolves to multiple canonical names (CNAMEs). The IP address on the request is then used to pick the CNAME that is geographically closest to the caller.

This simple approach works when there is only a first boundary service call that needs geolocation-based resolution, because there is additional latency involved with the extra lookup. However, when there are multiple boundary services or different domains with different constraints and deployment architectures, this simple approach is inadequate.

BRIEF DESCRIPTION OF THE DRAWINGS

The technology described herein is illustrated by way of example and not limited in the accompanying figures in which like reference numerals indicate similar elements and in which.

DETAILED DESCRIPTION

The technology described herein is generally directed towards configuring a client device to route requests from the client device to a correct service in a global environment, based on the client device's current client context during a client session and what the client is requesting. Each such service can be part of a group of globally distributed services and or microservices.

Once the client device is initially configured for a session, any request during that session is automatically routed to the appropriate service endpoint. As one example, client user-related data is communicated to and from a user service geographically located in the client user's registered home region location, regardless of where the client device is currently located. In the same session, client content-related data (e.g., video streaming content) data is communicated to and from a content service geographically located in the client device's current location.

Thus, in a more particular example, a European Union-based client user who is roaming in the United States will send user-related data requests directly to an endpoint corresponding to a user service physically located in the European Union, while content-related data requests will be sent to a content service geographically located in the United States. As will be understood, with the technology described herein, the user-related data thus does not have any additional hop or hops through a United States located service, and for example need not be further processed (e.g., sanitized) to meet European Union data privacy regulations. The content-related data, such as request for a catalog of current streaming video content offerings, will be sent to a service located in the United States region, and thus will return the catalog of offerings that is currently available in the United States. Note that this is in contrast to alternative solutions that route client requests to a nearest geographic service, followed by rerouting the request via one or more additional hops to the appropriate service, It should be understood that any of the examples herein are non-limiting. For instance, a client's user-related data requests versus content-related data requests are used as examples that are relatively straightforward to understand, however there are other client types of requests, such as a request to an authentication service, that are similarly each sent to an appropriate authentication service based on the client configuration. As another alternative, certain configuration-related data structures are described, including templates, dimension information, route key data, and endpoint data, however other suitable ways and/or structures to maintain and communicate such data can be used.

Figure 1:
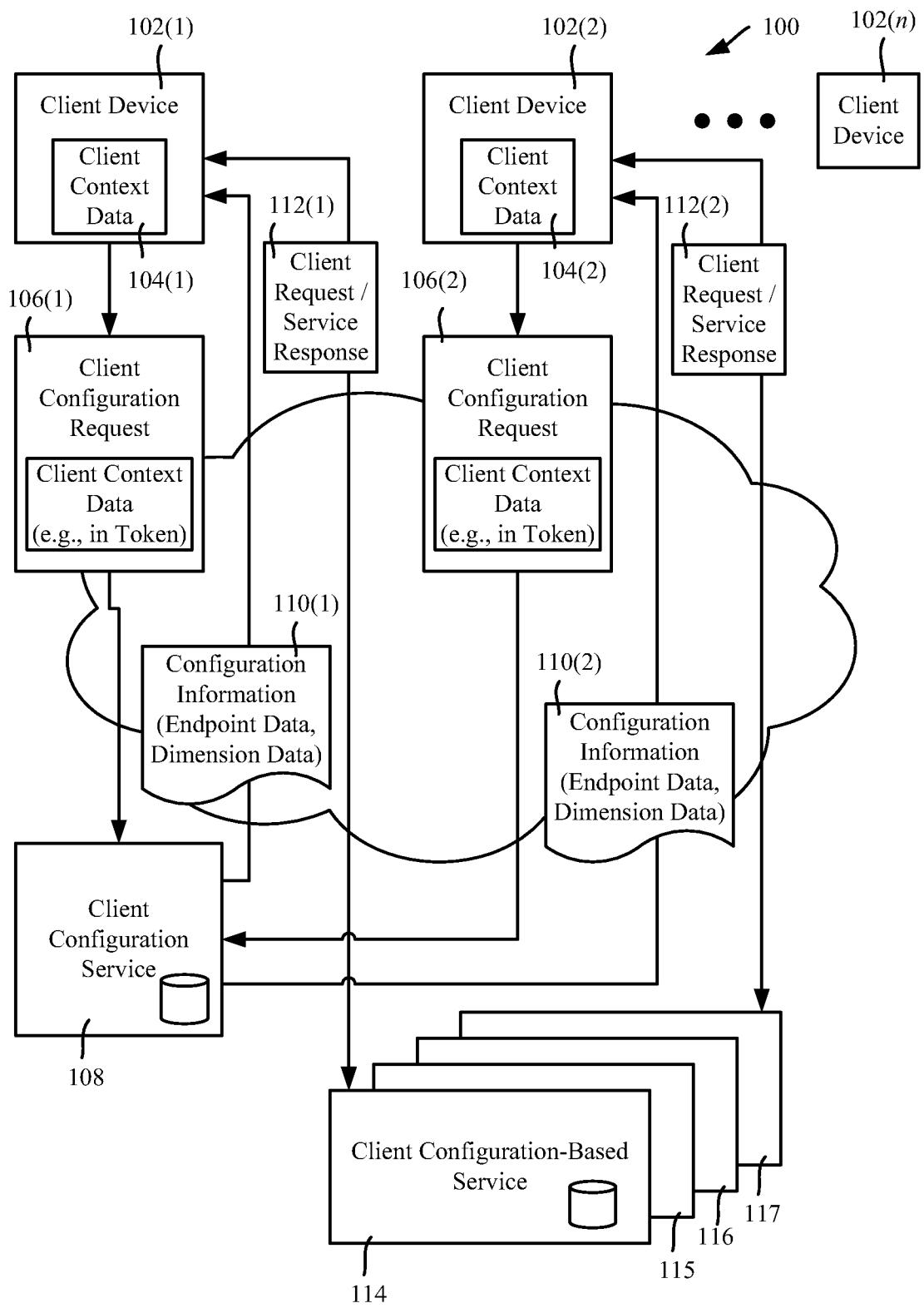
FIG. 1 is an example block diagram representation of a system in which client devices are configured with configuration information based on client context data, in accordance with various aspects and example implementations of the subject disclosure.

FIG. 1 is a generalized block diagram representation of an example system 100 in which client devices 102(1)-102(n) are associated with a global platform, such as client devices operated by valid subscribers of a global streaming video content provider. The global platform can comprise services and/or microservices in various servers including cloud services or the like located worldwide.

Each client device 102(1)-102(n) has a current client context; client context data 104(1) and 104(2) are depicted in FIG. 1. Client context data for a given client device can include (but is not limited to) the current client device location, the client device type, software version of the client application program that couples to the global platform, user information such as subscriber entitlement data, subscriber's home location, and so forth.

In general, the client devices (e.g., 102(1) and 102(2)) make respective client configuration requests (e.g., 106(1) and 106(2)) to a client configuration service 108. There can be a single client configuration service 108 as shown in FIG. 1, or there can be specific, global or local, endpoints or services (e.g., using latency based routing or the like) that return the configuration information 110(1) and 110(2) based on the client context data. In one implementation, the client context data is known for each client request from a token associated with the request.

In general and as described herein, the configuration information comprises endpoint data for various services to which the client device is to connect, along with dimension data for connecting to those services. In one implementation, the dimension data comprises a number of variables that correspond to route key data.

Subsequent, post-configuration requests (e.g., 112(1) and 112(2)) are thus routed to and responded by an appropriate service (e.g., one of the client configuration-based services 114-117) based on the endpoint configured for the type of request being made. Note that although four such services 114-117 are depicted in FIG. 1, there can be on the order of hundreds or thousands of such services in an actual global platform.

In this way, for example, a first client device such as the device 102(1) located in region X receives endpoints and dimension/route key data for connecting to a content service (e.g., 114) in region X, while a second client device such as 102(2) located in region Y receives endpoints and dimension/route key data for connecting to a content service (e.g., 117) in region Y. As will be understood, user-related data is routed via an appropriate endpoint based on the client user's (e.g., subscriber's) home location specified in or determinable from the client context data, regardless of whether the corresponding device being used by that client user is currently within the user's home location or is currently roaming in a different region.

Figure 2:
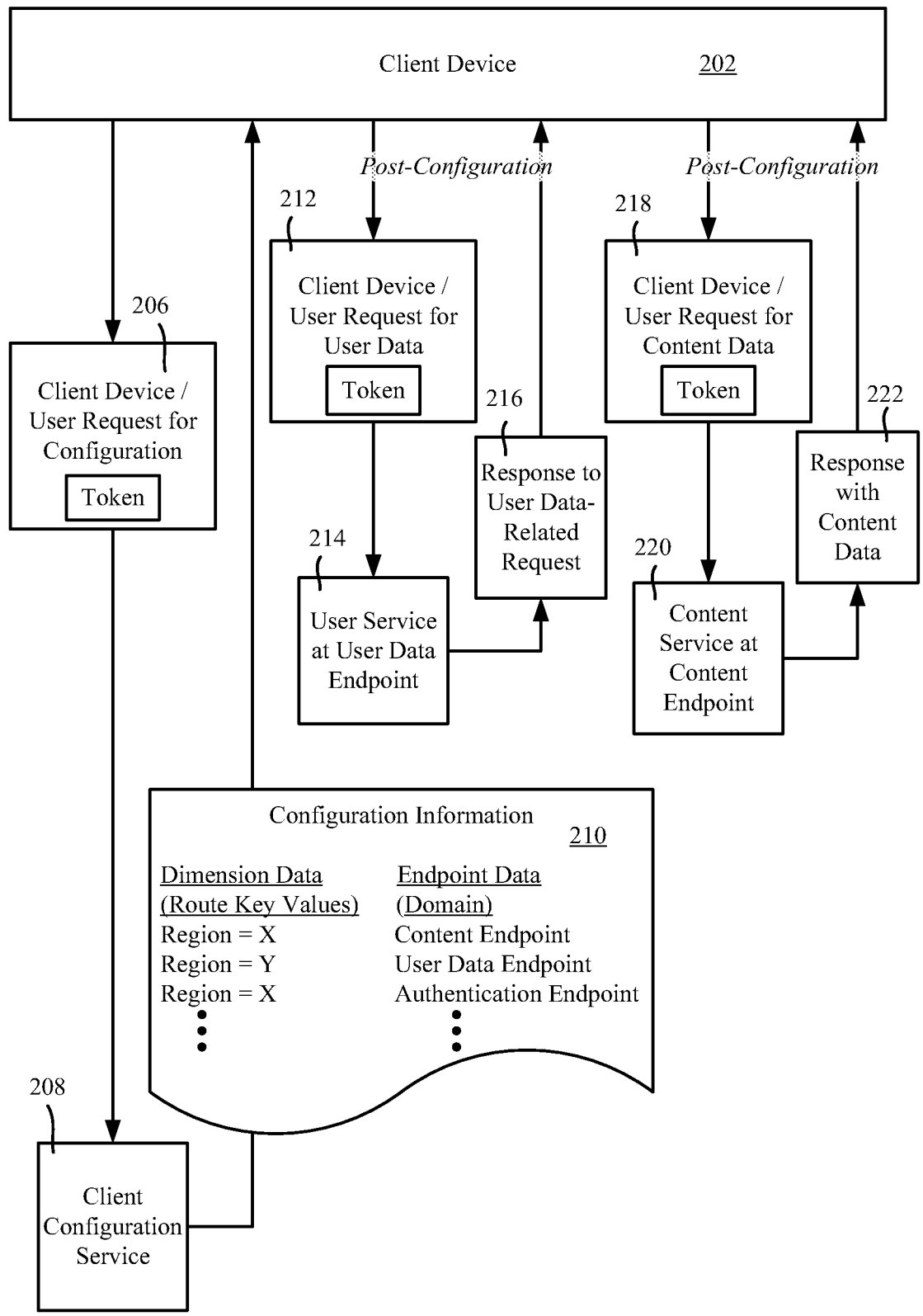
FIG. 2 is an example block diagram representation of how a client device is configured to use different services appropriate for the current client context, in accordance with various aspects and example implementations of the subject disclosure.

FIG. 2 is a further example, in which a client device 202 has identified itself as a valid client, and requests (block 206) configuration from a client configuration service 208, e.g., using a routing method such as, but not limited to, latency based routing, geo-IP based routing, or the like. There are various well-known ways for a client to login/identify/authenticate itself as a valid client for a session, and as such are not described hereinafter except to note that a token or other data can be obtained by the client device and then used thereafter during a session.

In the example of FIG. 2, the client device receives a configuration data structure (block 210) with route keys by querying any or a specific, global or local, endpoint or service that vends route keys (shown in FIG. 2 as the client configuration service 208). The route keys specify the values for each dimension to be used in connecting to a service. In one implementation, the route keys populate a structured logical name template for the endpoint or service.

The client uses a combination of the template and the service name (e.g., EU.content can indicate a content user to a specific European Union endpoint including domain) to identify the correct logical service to which to send requests at a given point in time. Any network layer protocol (like IPv4/IPv6)-based routing can be used to translate the logical service name to the physical IP address.

In the example of FIG. 2, once configured with the configuration information (endpoint data and dimension data), a user data-related request 212 is thus correctly routed to the user service 214, which returns an appropriate response 216. A content data-related request 218 is correctly routed to the content service 220, which returns an appropriate response 222.

Figure 3:
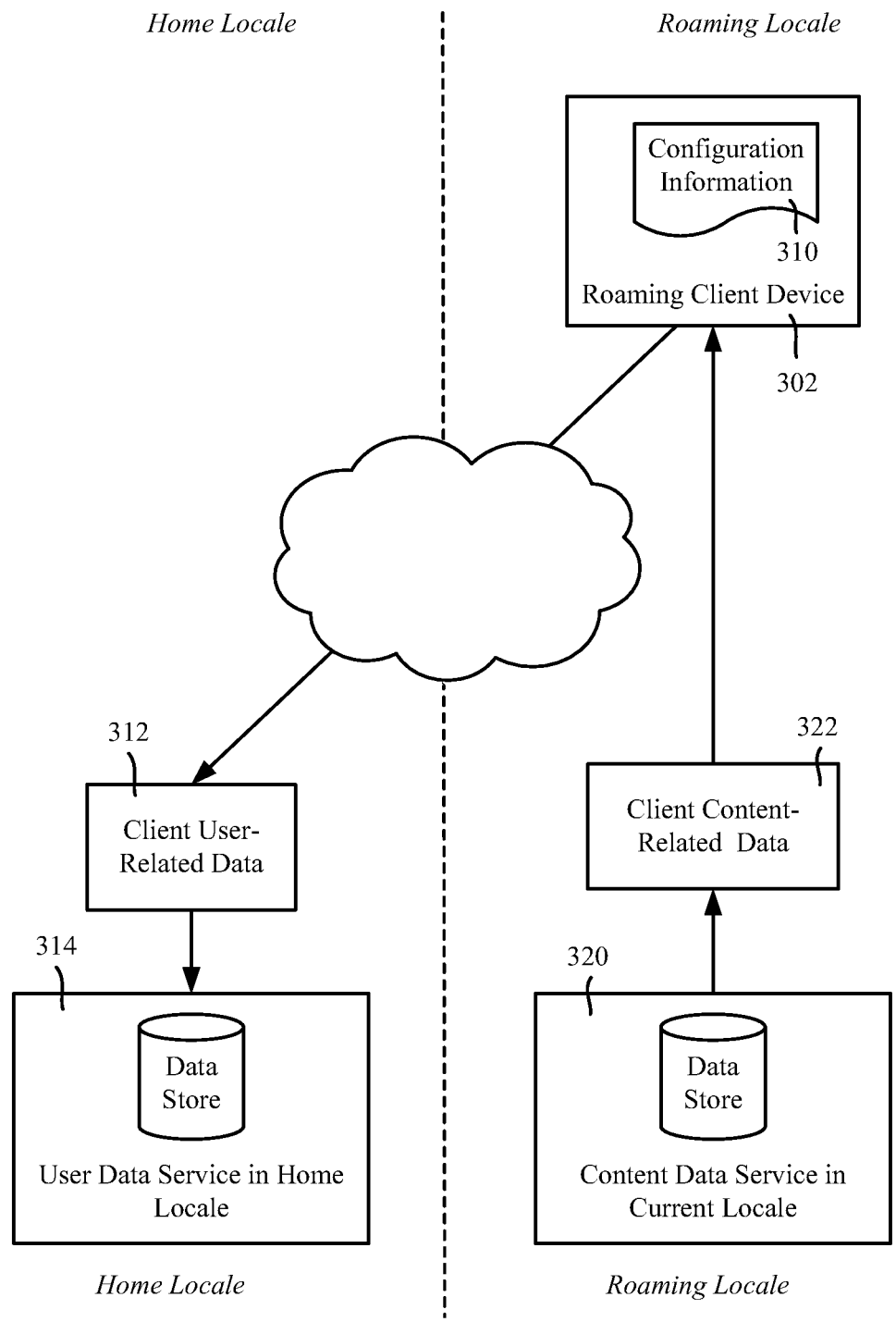
FIG. 3 is an example block diagram representation of how a client configuration facilitates client communications of user-related data to a home located service, while obtaining content while roaming from a content service in the roaming locale, in accordance with various aspects and example implementations of the subject disclosure.

FIG. 3 exemplifies how the client configuration information can be used to couple to an appropriate service during a session. Consider that in this example, a client user has a home locale such as the European Union, but is currently roaming on a device 302 in a roaming locale such as Latin America (or a specific country therein). This information is part of the current client context data. There is thus a user home roaming partition for user data and a content roaming locale partition for content data. Note that in addition to partitioning by region, partitions can be based on devices (e.g., different device types), or other parameters.

Once the client device 302 receives the configuration information 310 based on the current client context, the client device 302 will send client user-related data requests 312 to a user data service 314 in the user's home locale. These can be requests to obtain user data, and/or to store user data (e.g., with a data response or acknowledgement response from the service 314). The client device 302 will send content-related data requests to a content data service 320 in the current roaming locale, and thereby receive content 322 appropriate for (e.g., currently available for streaming in) the roaming locale.

Configuring the client based on the current client context at the session runtime is thus significantly advantageous in various ways. In the example of FIG. 3, certain client requests such as involving content can be routed to functionally correct endpoints with the lowest latency, based on the current locale. Other client requests such as involving user data can be sent to other functionally correct endpoints based on concepts such as legal jurisdiction, regulatory requirements and the like.

The configuration information (e.g., including the route keys comprising the values for each dimension) is refreshed based on current parameters according to certain conditions that, for example, make a route key(s) no longer relevant. For example, any change to the value of at least one of the dimensions results in a reconfiguration of the client, at least with respect to the changed dimension. For example, if a user travels from Sweden to Spain, the value in the content dimension changes such that the content partition changes to Spain's content partition.

Further, route keys expire after a certain period of time, e.g., when a user token expires. Reconfiguration of the client device occurs in response to route key/token expiration. Another reconfiguration is based on backup paths being triggered if any of the endpoints identified in the configuration information become unreachable for any of numerous possible reasons, such as the client being out of region for that endpoint, the endpoint fails, and so forth.

Figure 4:
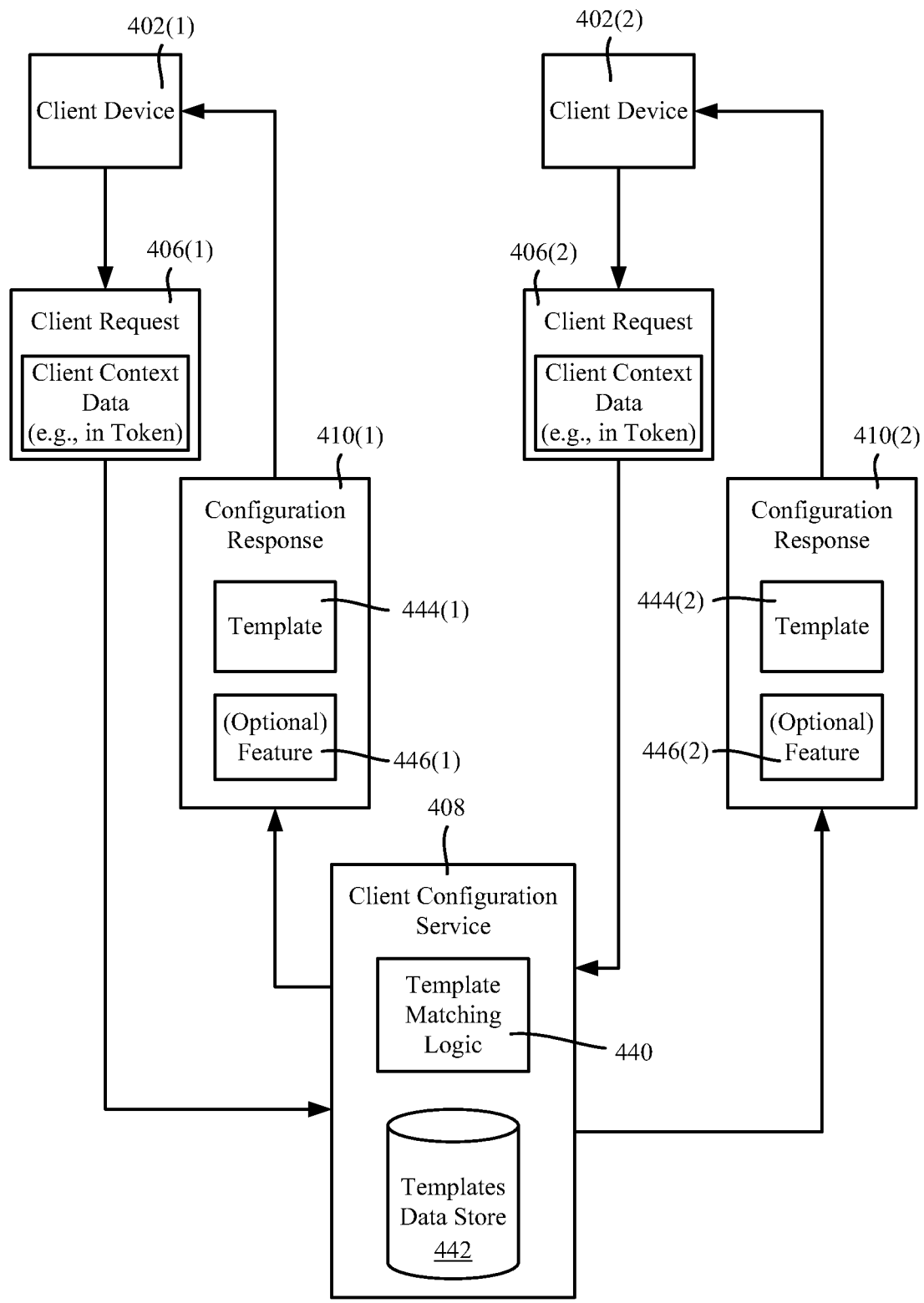
FIG. 4 is an example block diagram representation of how a client configuration based on templates and optional feature data, in accordance with various aspects and example implementations of the subject disclosure.

FIG. 4 illustrates the concept of templates, which can, for example, be tailored to a particular user experience. For example, instead of determining the client configuration information based on processing the client context data as it is received, the client configuration information can be maintained in an already existing, named template data structure that is matched to the client context data. As a more particular example, consider that there is one existing template for European Union clients roaming in Canada that have a mobile device type J running software version K, and another existing template for European Union clients roaming in Canada that have a (more powerful) personal computer running software version L. A first template can be matched and returned based on the first set of client context data for the mobile device type J running software version K, and second first template can be matched and returned based on the second set of client context data for the personal computer running software version L. As is understood, any device capable of running the client application program can be used, e.g., a set top box, a tablet computing device, and so on, and there can be different classes and subclasses of devices, e.g., different mobile phone devices from vendors or different versions from the same vendor, and so forth.

In FIG. 4, a client device 402(1) has one set of client context data, which is received via a configuration request 406(1) at a client configuration service 408. Another client device 402(2) has another set of client context data, which is received via a configuration request 406(2) at the client configuration service 408 (or possibly a different configuration service). In this example, the client configuration service 408 incorporates or is coupled to template matching logic 440 that determines a template 444(1) (e.g., found in a templates data store 442) that is appropriate for the client context data of the client device 402(1). The template 444(1) is thus returned in the configuration response 410(1) to the client device 402(1). For the client device 402(2) with its configuration request 406(2), the template matching logic 440 determines a template 444(2) that is appropriate for the client context data of the client device 402(2). The template 444(2) is thus returned in the configuration response 410(2) to the client device 402(2). Note that the templates data store 442 or the like can be replicated or be accessible to multiple client configuration services.

Although not explicitly shown in FIG. 4, there can be a default template in each client, and the service can send the parameters to populate the built-in template, or send updated templates. It is feasible for clients to cache templates, and for example have the configuration service return a template identifier that is appropriate for the current client context. The service can also optionally support creation of templates or updates to existing templates, and assign templates to specific endpoints or groups of endpoints FIG. 4 shows another concept, namely optional features 446(1) and 446(2) which can be included with endpoints, and which can be used to configure the experience of the user, particular in (but not limited to) a client in an unauthenticated state. Features can accompany configuration information/a template, and for example, can facilitate region based flagging, such as when user consent (e.g., based on regional privacy configuration defaults) is needed to perform some action. As another example, a feature can be returned regarding a minimum client version supported in a region and environment, such as to recognize that a client device's old software version is not valid in a current region, whereby via interaction with the user, the client device can obtain an update.

Figure 5:
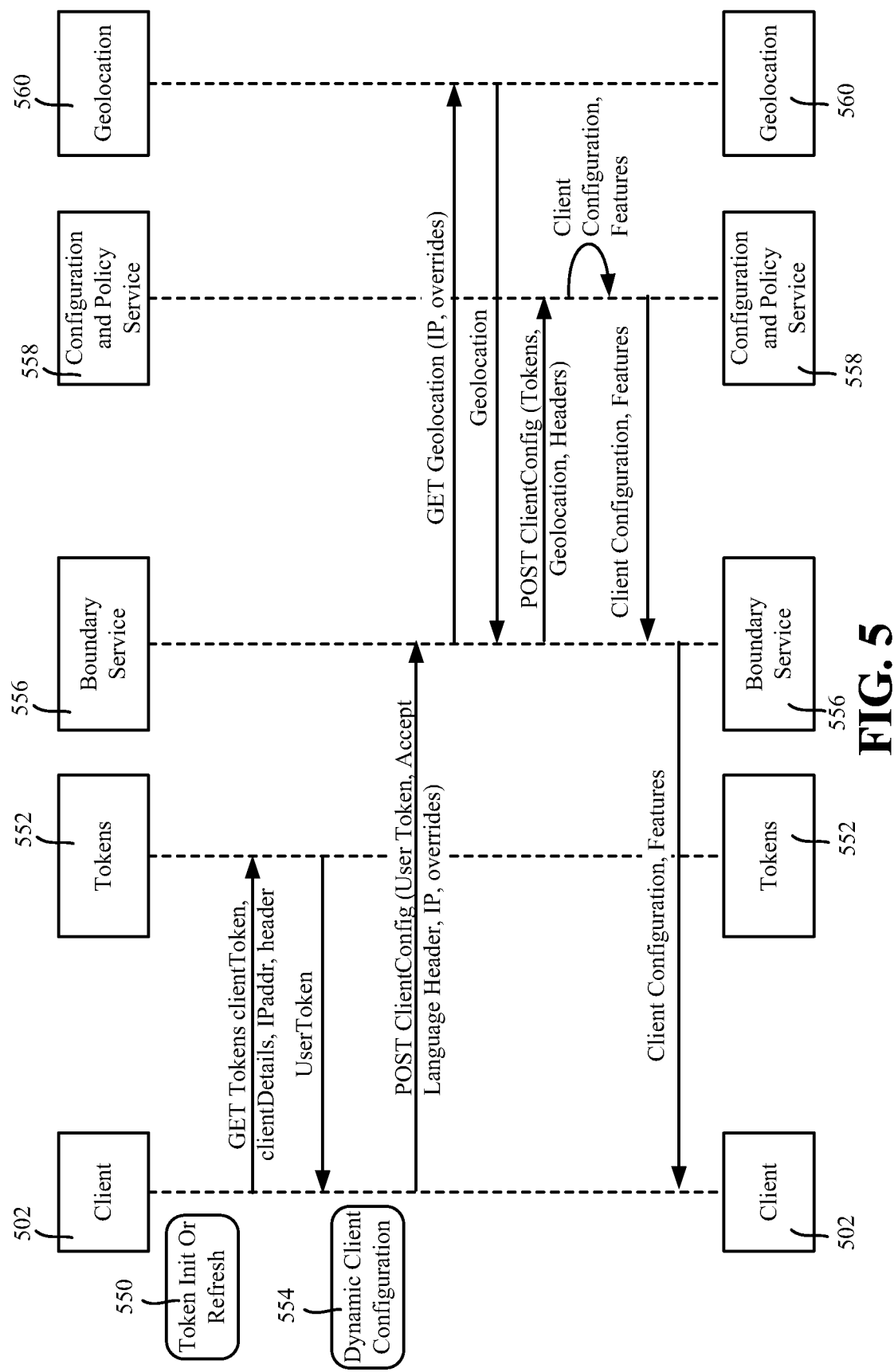
FIG. 5 is a sequence diagram of example communications/dataflow between various services that configure a client device as described herein, in accordance with various aspects and example implementations of the subject disclosure.

FIG. 5 is an example sequence diagram showing interactions between various entities that are related to dynamically configuring a client device 502 in one example implementation. In FIG. 5, to obtain or refresh a token (block 550) the client communicates via a "GET Tokens" call with client token and other data to a token service 552 or the like. This can be a known token initialization or refresh, that validates the client and converts a client token to a user token.

In this example, the client is properly authenticated and receives the user token for use in further communications, including for obtaining configuration information (block 554) as described herein. In one implementation, the configuration service can comprise a combination of a (local or global) boundary service 556, a configuration and policy service 558, and a geolocation service 560; that is, the client 502 interacts with the boundary service 502, which in turn calls the geolocation service 560, and the configuration and policy service 558.

For example, the geolocation service 560 can determine the location of the client device 502, (and possibly override the actual location for privileged users, such as developers and testers of the platform), and return the geolocation data to the boundary service 556. In turn, based on the location, the boundary service 556 calls the configuration and policy service 558, which determines the client configuration information as described herein, including any optional feature data; for example, minor policy data such as "no longer support this build" can be determined. This is returned to the client device via the boundary service 556.

In this way, the client receives appropriate endpoints for a list of services, based on the client IP address and location, device type (which can change configuration) location parameters to support, which can be based on software build and so on; (note that there can be a "special" software build for testing purposes). The many dimensions identify the correct environment, correct domain, correct geography and correct version of a service applicable to each client request. From a maintainability perspective, having a relatively small number of configurable clients is valuable, as the number and variety of devices a person uses keeps increasing. Therefore, there is value to methodically and efficiently determining the endpoints to which any client needs to connect, subject to the constraints in these various dimensions. Clients can thus communicate with microservices having different semantics and characteristics around the world, yet without extra hops to a home service.

In summary, the roaming capabilities means that client applications need to talk to different regional service instances or services depending on the user's current geo-location and applicable policies. To support this roaming ability, the technology described herein, via the configuration service, supplies the client with session-specific uniform resource locators (URLs) or the like for any endpoints invoked directly by the client.

Other aspects of the client configuration can vary based on the factors described herein. For example, the client may need to disable or filter certain third-party integrations. To support client configuration, the configuration service provides a set of named configuration objects for use by the client.

Client endpoint configuration assumes that endpoints referenced directly from the various clients are organized in some way, such as endpoints that provide specific functionality with an implied contract. An endpoint resolves to a URL (e.g., via an API on a common client library. Domains can correspond loosely to individual service domains in the application; each endpoint is associated with some domain.

In one implementation, domains supply a base URL for endpoints on the domain and an optional 'ext' parameter which indicates that the service is external.

Routing keys can be used to construct base URLs for each of the domains, as domain URLs typically follow a small number of consistent patterns. When a new configuration is requested, the client sends a configuration version identifier that indicates the set of required endpoints needed by the client as well as the domains and routing keys that are used in the implementation.

Figure 6:
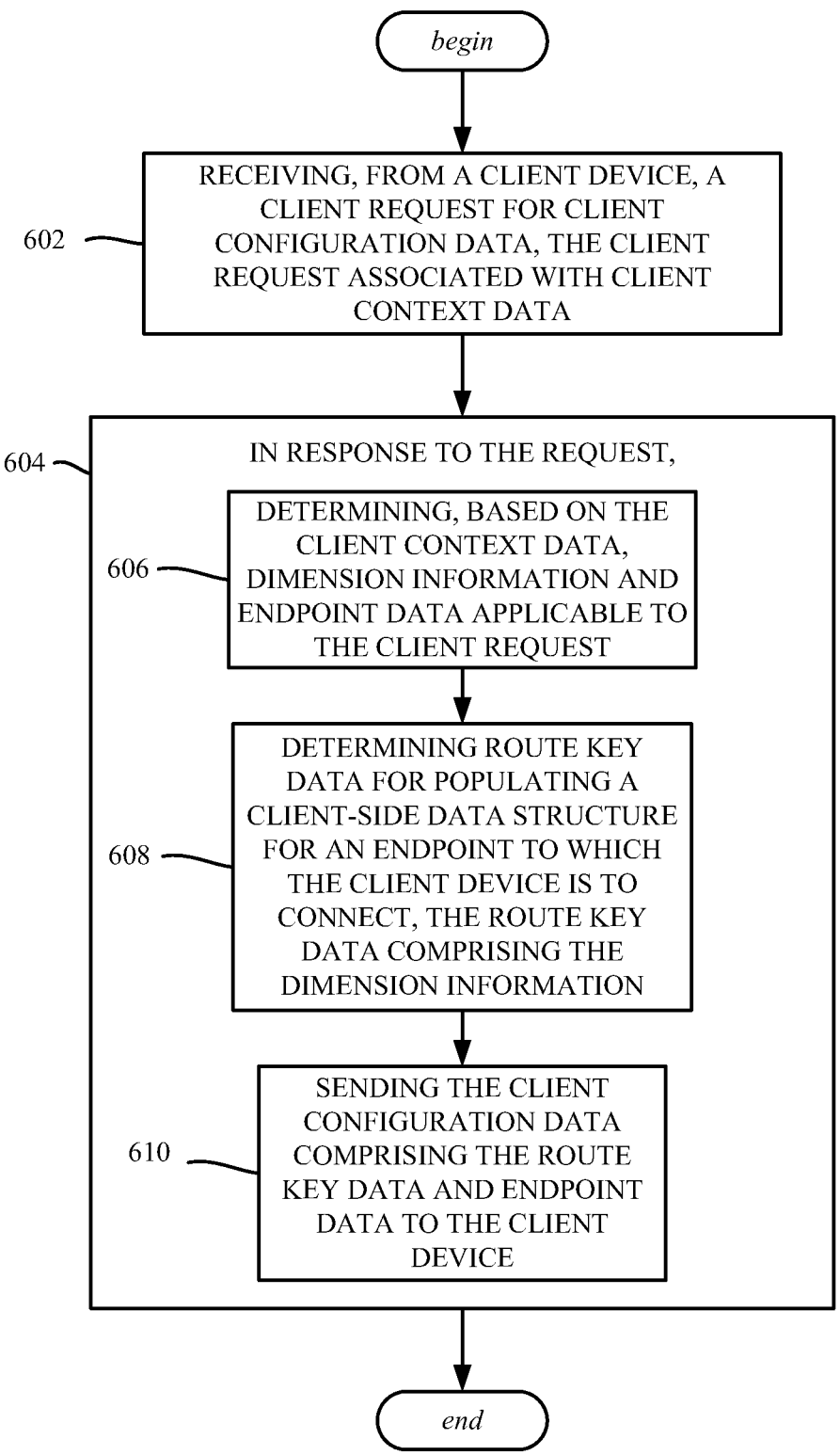
FIG. 6 is a flow diagram of example operations related to configuring a client device with endpoint data and dimension information based on current client context data, in accordance with various aspects and example implementations of the subject disclosure.

One or more aspects can be embodied in a system, such as represented in FIG. 6, and for example can comprise a memory that stores computer executable components/instructions, and a processor that executes computer executable components/instructions stored in the memory to perform operations. Example operations can comprise operation 602, which represents receiving, from a client device, a client request for client configuration data, the client request associated with client context data. As represented by operation 604, in response to the request, operations include determining, based on the client context data, dimension information and endpoint data applicable to the client request (operation 606), determining route key data for populating a client-side data structure for an endpoint to which the client device is to connect, the route key data comprising the dimension information (operation 608), and sending the client configuration data comprising the route key data and endpoint data to the client device (operation 610).

Further operations can include determining, based at least one of the client context data and the user context data, session configuration information comprising at least one of: endpoint data and dimension data applicable to the client request The client context data can include at least one of client device location data, client device type data, or client software type data.

The dimension information can include at least one of: environment data corresponding to a service applicable to the client request, domain data corresponding to a service applicable to the client request, geographic data corresponding to a service applicable to the client request, or version data corresponding to a service applicable to the client request.

The endpoint data can correspond to a service.

Further operations can include detecting a change to the dimension information, and in response to detecting the change, refreshing the route key data with refreshed route key data based on the change to the dimension information, and sending refreshed client configuration data comprising the refreshed route key data to the client device.

Further operations can include detecting expiration of the route key data, and in response to detecting the expiration, refreshing the route key data with refreshed route key data based on the expiration, and sending refreshed client configuration data comprising the refreshed route key data to the client device.

Further operations can include detecting an unreachable endpoint associated with the endpoint data, and in response to detecting the unreachable endpoint, refreshing the client configuration data with refreshed endpoint data comprising a backup path to another endpoint, and sending refreshed client configuration data to the client device.

The client-side data structure can include a structured template, and the route key data can be configured for populating the structured template.

Further operations can include creating a new structured template, and sending the new structured template to the client device.

Further operations can include updating the structured template to an updated structured template, and sending the updated structured template to the client device.

Further operations can include determining feature data based on the client context data, and sending the feature data to the client device.

The feature data can include at least one of: regional configuration data corresponding to region information identified from the client context data, regional uniform resource locator data corresponding to region information identified from the client context data, regional default data corresponding to region information identified from the client context data, regional privacy configuration information corresponding to region information identified from the client context data, or client software version-related information.

Figure 7:
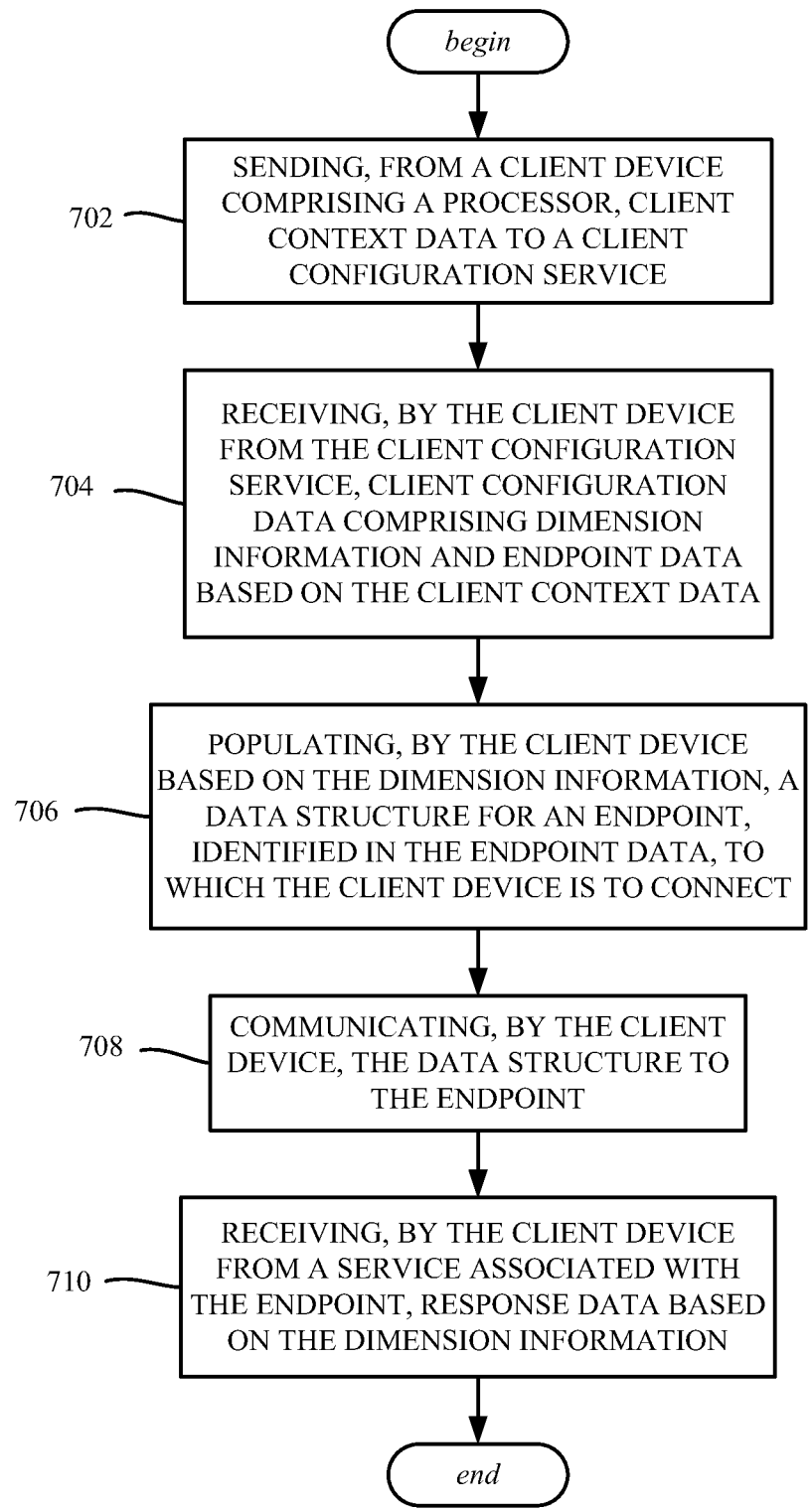
FIG. 7 is a flow diagram of example client device operations related to obtaining configuration information and using the configuration information to communicate with a service, in accordance with various aspects and example implementations of the subject disclosure.

One or more example aspects, such as corresponding to operations of a method, are represented in FIG. 7. Operation 702 represents sending, from a client device comprising a processor, client context data to a client configuration service. Operation 704 represents receiving, by the client device from the client configuration service, client configuration data comprising dimension information and endpoint data based on the client context data. Operation 706 represents populating, by the client device based on the dimension information, a data structure for an endpoint, identified in the endpoint data, to which the client device is to connect; (note that the client can select a semantically distinct end point instance(s). For example, a home page in Swedish is a logical abstraction which can be rendered by a semantically distinct service in the EMEA region. The mapping of that semantic endpoint to a physical location is done using standard network layer protocols). Operation 708 represents communicating, by the client device, the data structure to the endpoint; Operation 710 represents receiving, by the client device from a service associated with the endpoint, response data based on the dimension information.

The client context data can identify a current region of the client device, and receiving the response data can include receiving user experience defining data associated with the current region. There can be direct calls to services associated with content (e.g., usually in the current region, not the user's home region, passing user information to other calls, and/or service-to-service calls from the content locale to the user locale.

The client context data can identify a user identity of a user of the client device, the endpoint data can include a service located within a user locale associated with the user identity, and receiving the response data can include receiving user data associated with the user locale.

Operations can include receiving, by the client device from the client configuration service, feature data, and responding to the client configuration service based on the feature data.

Figure 8:
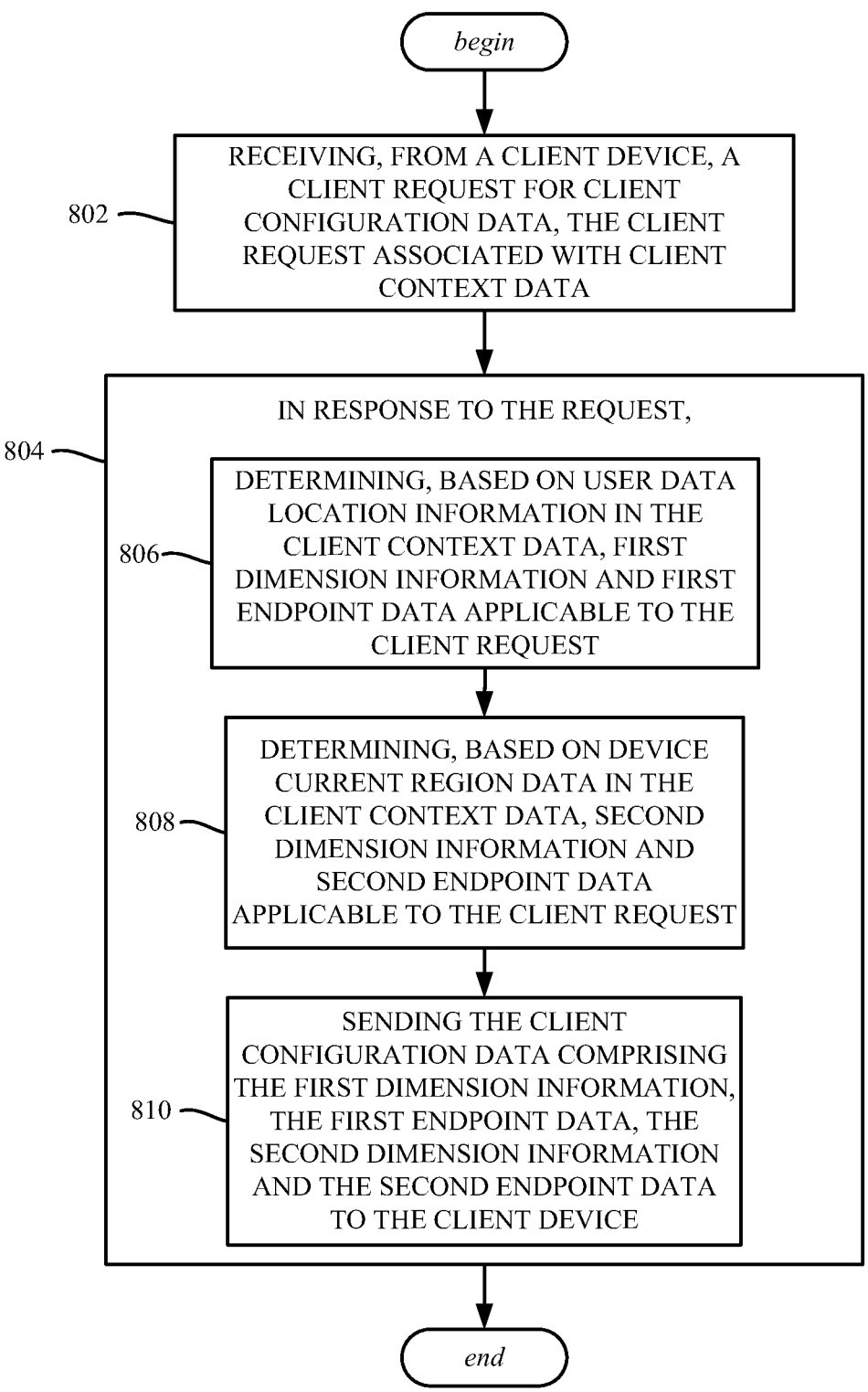
FIG. 8 is a flow diagram of example operations related to configuring a client device with first and second endpoint data and first and second dimension information based on current client context data, in accordance with various aspects and example implementations of the subject disclosure.

FIG. 8 summarizes various example operations, e.g., corresponding to executable instructions of a machine-readable medium, in which the executable instructions, when executed by a processor, facilitate performance of the example operations. Operation 802 represents receiving, from a client device, a client request for client configuration data, the client request associated with client context data. Operation 804 represents, in response to the request, determining, based on user data location information in the client context data, first dimension information and first endpoint data applicable to the client request (operation 806), determining, based on device current region data in the client context data, second dimension information and second endpoint data applicable to the client request; (operation 808), and sending the client configuration data comprising the first dimension information, the first endpoint data, the second dimension information and the second endpoint data to the client device (operation 810).

Further operations can include sending feature data to the client device.

Determining the first dimension information and first endpoint data applicable to the client request can include determining first route key data for communicating with a user data service corresponding to the first endpoint, and determining the second dimension information and the second endpoint data applicable to the client request can include determining second route key data for communicating with a content service corresponding to the second endpoint.

As can be seen, there is described a technology in which client requests belonging to the same domain need only one initial lookup of the correct domain to route the requests, instead of introducing an extra hop of latency and traffic to the global or local endpoint on each request to resolve to the correct endpoint, such as when there are multiple domains domiciled in different geographical regions due to business constraints, for example. The technology thus reduces the unnecessary hops, traffic and latency via one initial lookup for client configuration, followed by efficient routing to the correct domain specific services.

The technology can perform client to service routing with minimal hops using templated route keys. Benefits include, but are not limited to, reduction of network traffic through more efficient routing from clients, reduction of latency experienced by the user through more efficient routing from clients, partitioning traffic based on business rules that are difficult to infer with commodity network appliances, keeping communication between services generally to a required minimum leading to reduced cloud infrastructure network and scaling costs, and facilitating tighter remote control of clients in production environments by being able to reroute client requests with generally minimal intervention. For example, the system can work around issues with in-market clients by redirecting them based on context. The technology described herein is extensible to many types of environments.

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 9 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 9:
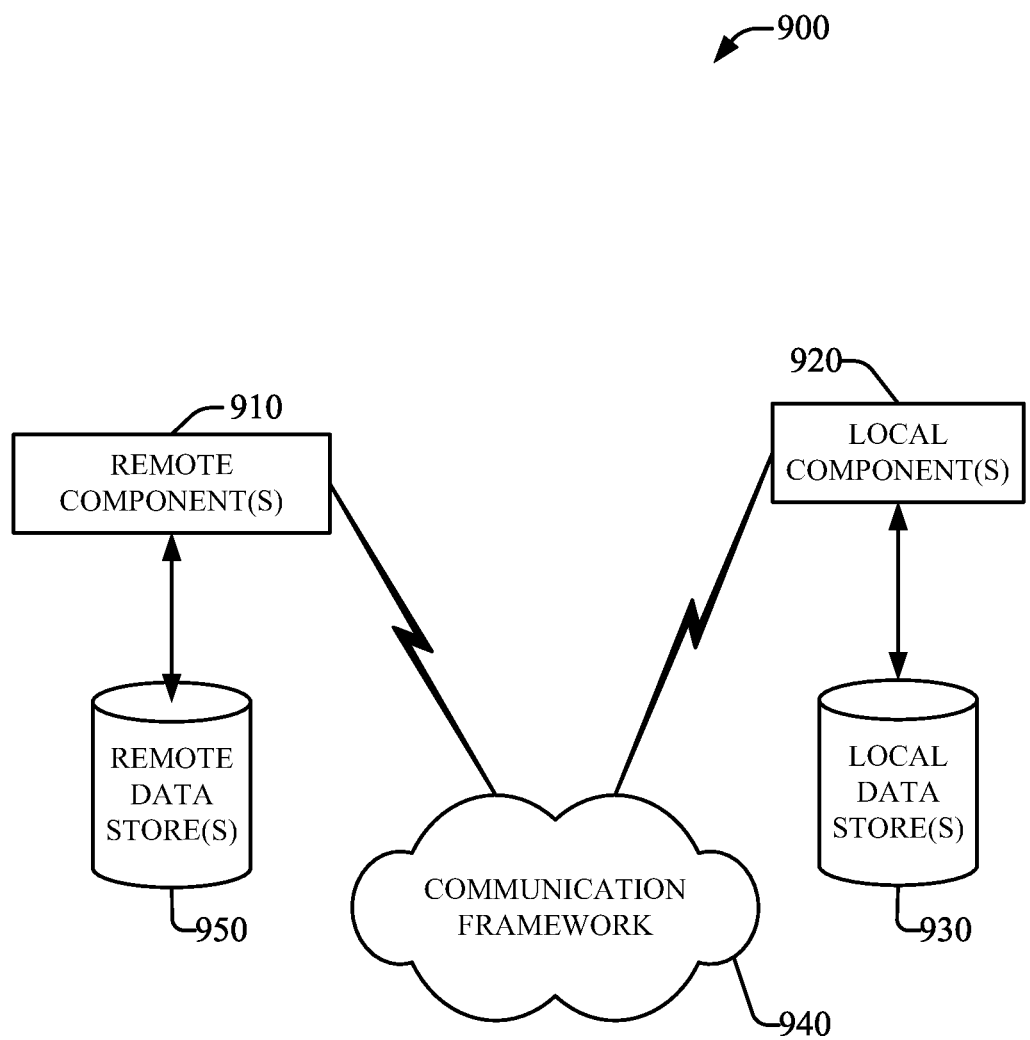
FIG. 9 is a block diagram representing an example computing environment into which aspects of the subject matter described herein may be incorporated.

FIG. 9 thus illustrates a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
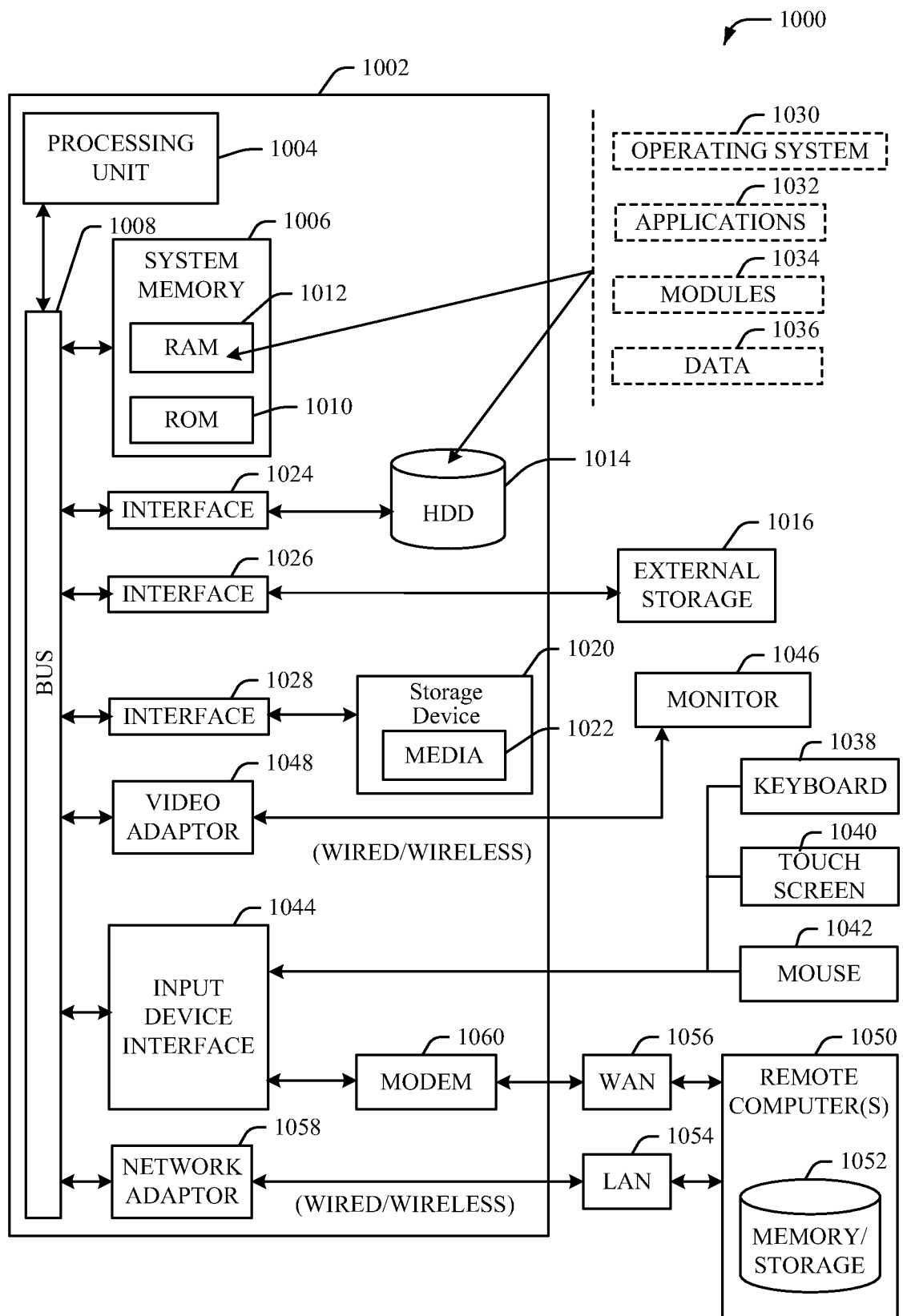
FIG. 10 depicts an example schematic block diagram of a computing environment with which the disclosed subject matter can interact, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor; and
a memory that stores executable instructions that, when executed by the processor of the system, facilitate performance of operations, the operations comprising:
receiving, from a client device, a client request for client configuration data, the client request associated with client context data,
in response to the request, determining, based on the client context data, a structured template, wherein the structured template is configured for use with the client device having a specified geographic origination location,
based on the client configuration data corresponding to the structured template, directing the sending of a request from the client device to an endpoint device, wherein an endpoint comprising the endpoint device is specified by the structured template as being within the specified geographic origination location.

2. The system of claim 1, wherein a type of the request is one of a user data-related request or a content data-related request, and wherein the use of the endpoint is based on the type of the request.

3. The system of claim 2, wherein the operations further comprise:
based on the client configuration data, sending a second request from the client device to a second endpoint, wherein the second endpoint is a geographically nearest endpoint to the client device, wherein a second type of the second request is the other one of a user data-related request or a content data-related request, and wherein the use of the second endpoint is based on the type of the second request.

4. The system of claim 1, wherein the use of the specified geographic origination location complies with a data transfer compliance requirement associated with the client device or with the specified geographic origination location.

5. The system of claim 1, wherein the use of the specified geographic origination location complies with a data transfer compliance requirement associated with an entity associated with the client device or with data being transferred in association with the request.

6. The system of claim 1, further comprising:
template matching logic employed by the processor to determine the structured template from a set of available structured templates, including the structured template, based on the client context data.

7. The system of claim 1, wherein the determining the structured template comprises locating the structured template at a cache at the client device.

8. The system of claim 1, wherein the operations further comprise:
updating the structured template based on data received at the system specifying a compliance requirement related to data transfer.

9. The system of claim 1, wherein the operations further comprise:
based on the client configuration data, sending, to the client device, notification of a software version update to a software employed at the client device.

10. A non-transitory machine-readable medium, comprising executable instructions that, when executed by a processor, facilitate performance of operations, the operations comprising:
sending, from a client device, a client request for client configuration data, the client request associated with client context data;
in response to the request, automatically receiving a structured template identifier defining a structured template cached at the client device, wherein the structured template is configured for use with the client device having a specified geographic location; and
based on the structured template, directing the sending of a request from the client device to an endpoint device, wherein an endpoint comprising the endpoint device is specified by the structured template as being within the specified geographic origination location.

11. The non-transitory machine-readable medium of claim 10, wherein the structured template is configured for use with the client device based on at least one of: a request type of a user data-related request, a request type of a content data-related request, the specified geographic origination location of the client device, a current geographic location of the client device, a type of the client device, a software of the client device, or a requirement associated with an administrator of the client device.

12. The non-transitory machine-readable medium of claim 10, wherein the operations further comprise:
receiving and implementing an update to the structured template based on the client context data sent from the client device.

13. The non-transitory machine-readable medium of claim 10, wherein the operations further comprise:
receiving a command to delete a second structured template based on the client context data sent from the client device.

14. A method, comprising:
receiving, from a client device, a client request for receiving first data or sending second data;
based on the client request, and based on one or more parameters generated from client context data associated with the client request, identifying a structured template,
wherein the structured template is configured for use with at least one of the client request being a user data-related request type or the client request being a content data-related request type, and
wherein the structure template is configured for use with the client device having a specified geographic origination location; and
using the structured template to direct execution of the client request at the client device to an endpoint at the specified geographic location, wherein the endpoint is specified by the structured template as being within the specified geographic origination location.

15. The method of claim 14, further comprising:
receiving, from the client device, the client context data; and
based on the client context data, generating the one or more parameters.

16. The method of claim 14, further comprising:
based on the one or more parameters generated from the client context data, generating the structured template to be identified at the identifying; and
in response to the generating the structured template, and based on the one or more parameters generated from the client context data, assigning the structured template for use in instances of the user data-related request type or the content data-related request type.

17. The method of claim 16, further comprising:
in response to the generating the structured template, caching the structured template at the client device.

18. The method of claim 14, further comprising:
based on the one or more parameters generated from the client context data, updating a default structured template with the one or more configurations defining communication use by the client device, wherein the structured template identified is the updated default structured template.

19. The method of claim 14, further comprising:
directing deletion of a structured template, other than the structured template, based on the client context data.

20. The method of claim 14, further comprising:
using the structured template to direct execution of the client request at the client device to the endpoint further being associated with a request type of the client request being the user data-related request type or the content data-related request type.

* * * * *